United States Patent
Watts et al.

[15] 3,667,359
[45] June 6, 1972

[54] PHOTO INSPECTION POD ASSEMBLY FOR PIPELINES

[72] Inventors: Raymond K. Watts; Walter Harry Chapman, both of El Paso, Tex.

[73] Assignee: El Paso Natural Gas Company, El Paso, Tex.

[22] Filed: Nov. 25, 1969

[21] Appl. No.: 879,872

[52] U.S. Cl. .................................................. 95/11 HC
[51] Int. Cl. .................................................. G03b 37/00
[58] Field of Search ................................. 95/11; 243/1

[56] References Cited

UNITED STATES PATENTS

| | | | |
|---|---|---|---|
| 2,899,856 | 8/1959 | Shull | 95/11 HC |
| 680,697 | 8/1901 | Cowley | 243/1 |
| 2,940,370 | 6/1960 | Yandell | 95/11 |

Primary Examiner—John M. Horan
Attorney—Bacon & Thomas

[57] ABSTRACT

A self-contained inspection pod assembly for pipelines, propelled by gas pressure within the pipeline. The pod assembly has resilient cups thereon equipped with spring-loaded calibrated valves that stabilize travel speed, and contains rearwardly directed photographic camera means for periodically taking pictures of the pipeline's interior.

8 Claims, 7 Drawing Figures

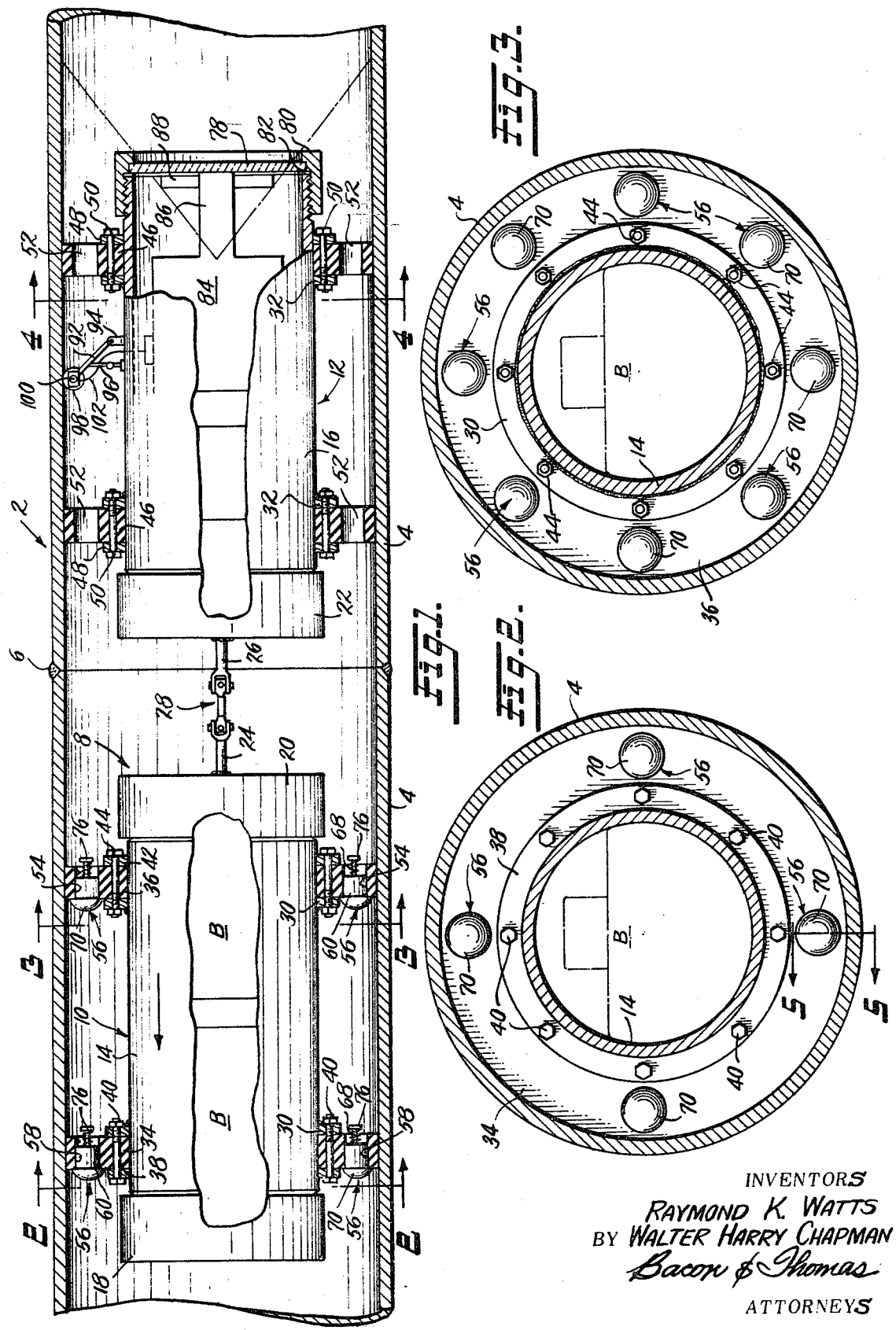

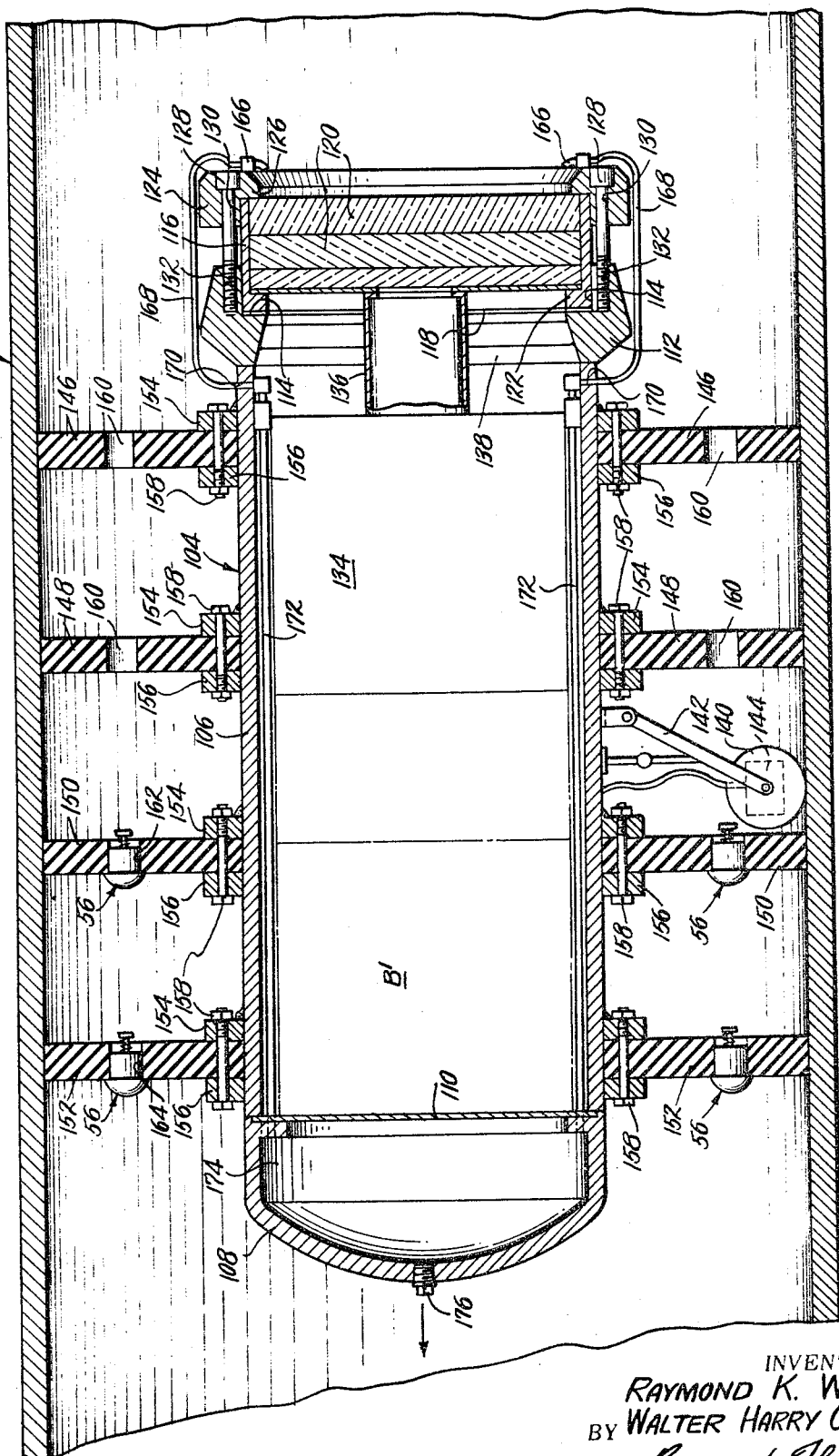

3,667,359

PHOTO INSPECTION POD ASSEMBLY FOR PIPELINES

BACKGROUND OF THE INVENTION

1. Field of the Invention

This invention relates generally to means for inspecting the interior of a pipe line, and more particularly to a self-contained inspection pod assembly designed to be propelled through a pipeline at substantially constant speed by gas pressure within the pipeline, and which contains photographic camera means operable periodically to take a picture of the pipeline's interior surface.

2. Description of the Prior Art

Since nearly the advent of transmission pipelines for transporting natural gas and the like, there has been a search for an effective, safe and uncomplicated device for inspecting a pipeline's interior. Such inspection is desirable to locate leaking or failing joints, structural weaknesses, the buildup of undesirable substances on the pipeline's inner surface, and other present or potential defects in the pipeline.

In the past, inspection devices mounted on an elongated support have been devised for insertion into the open end of a pipeline section, but such devices are obviously unsuited to inspecting miles of an installed and operating pipeline. Efforts have also been made to design devices that can be pulled through a pipeline by a cable, but such by their nature are awkward to work with and thus are of limited value.

For inspection of long distances of pipeline, self-propelled inspection devices have been suggested. Because such devices must incorporate a motor means, they are rather bulky and heavy, and their travel time is limited by the amount of stored energy they can carry for propulsion purposes.

To overcome the deficiencies of the devices described thus far, it has been suggested that an inspection pod be devised that is propelled by gas pressure present in the pipe line. A problem with this concept until now has been to provide an inspection pod that will remain centered in the pipeline, and which moves at a relatively stable speed. The present invention for the first time solves this problem in a satisfactory manner.

The use of cameras to inspect a pipeline interior has been suggested in the past, and inspection devices equipped with television cameras have been developed. However, their utility has been limited by the need for using transmission wires strung through the pipe, and by inadequate picture quality. The need for an inspection device capable of making an accurate photographic picture of a pipeline's interior has been expressed, but until the present invention no satisfactory device for this purpose has been devised.

To make an accurate photographic record of a lengthy pipeline an inspection pod must provide a relatively stable camera platform, and the pod should move through the pipeline at a relatively constant speed. Moreover, the camera equipment must be designed to operate so that an accurate and complete photographic record can be obtained. The inspection pod assembly of the present invention fully satisfies all these requirements.

SUMMARY OF THE INVENTION

In the first embodiment of the present invention the inspection pod assembly is articulated to facilitate movement through curved portions of a pipeline, and comprises two pod units connected by a universal coupling. Both pod units have a plurality of flexible propulsion cups thereon that extend radially from the units to engage the interior surface of the pipeline. The propulsion cups on the rear pod unit have unobstructed ports therethrough, while the cups on the front unit have ports therethrough equipped with spring-biased valves designed to open when a preselected pressure exists therebehind.

This arrangement of propulsion cups, ports and relief valves ensures that the front pod unit will always tend to pull or lead the rear unit, which in turn prevents buckling of the inspection pod and ensures that it will remain centered. Further, because the relief valves will open when a preselected gas pressure is reached behind the pod assembly, pressure surges in the pipeline cause no problem and the speed of the assembly is stabilized within acceptable limits.

The rear pod unit is fitted with a window on its aft end, and contains a photographic camera aimed rearwardly through said lens assembly. A strobe light means is mounted within the rear pod about the camera lens, and the camera and strobe light are connected into a control circuit supplied with power from batteries carried by the front pod unit. The camera and strobe light means are actuated periodically through said circuit by means of a counter wheel mechanism supported by a hinged boom from the rear pod unit, and which is held in engagement with the pipeline's interior surface.

The counter wheel mechanism measures the travel of the inspection pod assembly, and after each passage of a preset distance actuates the camera means to take a picture rearwardly down the pipeline. This preset distance is chosen for the camera equipment being utilized, so that when successive photographs are placed in end-to-end alignment, a complete photographic record of the pipeline interior is obtained.

In a second embodiment of the invention, only one pod unit is employed. Here again, resilient cups are mounted on the unit, and the unit contains a rearwardly directed camera means.

The invention also contemplates means for preventing fogging of the pod lens assembly. For this purpose a plurality of gas jets are mounted to project over the exposed surface of the pod lens assembly, and are supplied with inert gas from a reservoir within the pod assembly.

It is the principal object of the present invention to provide a self-contained inspection pod assembly containing a photographic camera and arranged to be propelled through a pipeline by gas pressure therein, designed to produce an accurate and complete photographic record of the pipeline's interior.

Another object is to provide a pod assembly designed to be moved through a pipeline by gas pressure, and incorporating means to bypass gas pressure surges and stablize the speed of the pod assembly.

A further object is to provide camera equipment for a pipeline inspection pod assembly, designed to make an accurate photographic record of the pipeline's interior.

Yet another object is to provide a pipeline photo inspection pod assembly equipped with means to assure that the lens for the camera equipment is kept clear and unclouded.

Other objects and many of the attendant advantages of the invention will become readily apparent from the following Description of the Preferred Embodiments, when taken in conjunction with the accompanying drawings.

BRIEF DESCRIPTION OF THE DRAWINGS

FIG. 1 is a fragmentary side elevational view, partly in section, showing the first embodiment of the present inspection pod assembly in operative position within a section of pipeline;

FIGS. 2, 3 and 4 are enlarged views taken on the lines 2—2, 3—3 and 4—4 of FIG. 1, respectively, showing details of the propulsion cup assemblies;

FIG. 7 is a longitudinal sectional view of a second embodiment of the invention, wherein only a single pod unit is employed.

DESCRIPTION OF THE PREFERRED EMBODIMENT

Figure 4:
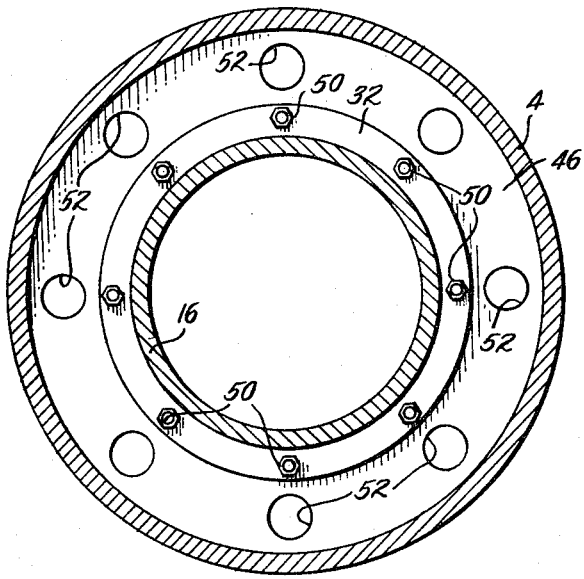
Figure 6:
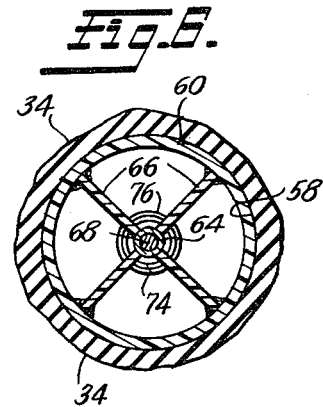
FIG. 6 is a sectional view taken on the line 6—6 of FIG. 5.

Referring now to FIG. 1, a pipeline is indicated at 2 and comprises pipe sections 4 placed in end-to-end relationship and secured together by a weld 6. The pipeline 2 will conventionally be buried in the earth and will extend over many miles, and is designed to carry natural gas or the like under a relatively high pressure.

Disposed within the pipeline 2 is the inspection pod assembly 8 of the first embodiment of the present invention, said assembly comprising a front unit 10 and a rear unit 12 that include cylindrical casings 14 and 16, respectively, each externally threaded on its opposite ends. The casing 14 of the front unit 10 is closed by front and rear end caps 18 and 20, respectively, and the forward end of the aft pod unit 12 is closed by a similar end cap 22.

The end caps 20 and 22 have aligned stub shafts 24 and 26, respectively, connected thereto, and which lie on the longitudinal axis of the assembly 8. The outer ends of the shafts 24 and 26 are connected by a universal coupler 28, whereby the pod unit 10 can bend in any direction relative to the aft pod unit 12. This articulation of the inspection pod assembly 8 permits said assembly to move easily and without binding through curved portions of the pipeline 2.

A pair of annular flanges 30 is welded to the exterior of the cylindrical casing 14, and a similar pair of flanges 32 is welded on the rear pod casing 16, the outer diameters of the flanges 30 and 32 being substantially less than the inner diameter of the pipeline 2. Front and rear annular propulsion cups 34 and 36 are received on the front pod unit 10, said cups being made of resilient material such as rubber and being installed before the end caps 18 and 20.

The cups 34 and 36 extend radially between the casing 14 and the inner surface of the pipeline 2, and thus function to maintain the front pod u-it 10 centered within said pipeline. Because the cups 34 and 36 are made of resilient material, the outer peripheries thereof will readily deform to pass over any dents, burrs or other protrusions on the inner pipeline surface. The front cup 34 butts against the front face of the forwardmost flange 30, and is clamped thereto by an annular ring 38 and bolts 40. Similarly, the rear cup 36 butts against the rear face of the other flange 30 and is secured by an annular ring 42 and bolts 44.

The aft pod unit 12 has a pair of identical propulsion cups 46 thereon, formed like the cups 34 and 36 from resilient material and which extend radially between the casing 16 and the inner wall of the pipeline 2. The cups 46 butt against the flanges 32, and are secured in position by annular rings 48 and bolts 50.

The inspection pod assembly 8 is inserted into the pipeline 2 by a conventional pipeline pig launcher (not shown) and is recovered a desired distance downstream by a conventional pig catcher (also not shown). The assembly 8 is propelled through the pipeline 2 in the direction of flow by gas pressure existing within the pipeline. For proper operation of the assembly 8 both pod units 14 and 16 should remain centered, and the travel speed should be relatively stable and free from the influence of pressure surges. The pod assembly 8 is designed to achieve these ends.

The pod assembly 8 is propelled by gas pressure pushing against the pod unit surfaces, the propulsion cups 34, 36 and 46, the flanges 30 and 32, and the rings 42 and 48. Preferably, the front pod unit 10 should lead or pull the rear pod unit 12, as this will prevent buckling and binding of the pod assembly 8 and will help keep it properly centered in the pipeline 2. The assembly 8 is designed to ensure such leading by the front unit, and also to eliminate variations in speed caused by pressure surges. The latter feature is important for best operation of the pod assembly.

Referring again to the drawings, the propulsion cups 46 on the rear pod unit 12 are designed to bypass a portion of the gas pressure exerted thereagainst, and for this purpose they each have a large plurality of circumferentially evenly spaced bypass ports 52 therethrough. Eight such ports 52 are shown in each cup in the drawings, but this can be increased or decreased if desired.

The rear propulsion cup 36 on the front pod unit 10 has eight bypass ports 54 therethrough, but each is fitted with a spring-biased relief valve unit 56. The front propulsion cup 34 has a smaller plurality of bypass ports 58 therethrough, four as shown in the drawings, and each is fitted with a valve unit 56. The valve units 56 are designed to open at a preset pressure, and when open serve to bypass a pressure surge past the pod assembly 8.

Figure 5:
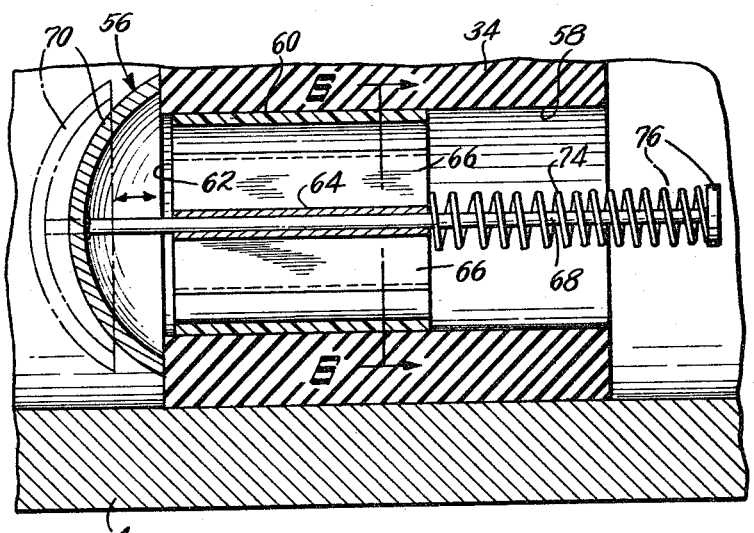
FIG. 5 is an enlarged longitudinal sectional view taken on the line 5—5 of FIG. 2, and showing in detail the construction of one of the pressure bypass relief valves.

The construction of one of the valve units 56 is shown in FIG. 5, and includes a tubular carrier sleeve 60 that is secured within the bypass port 58 so that the front end 62 thereof is somewhat recessed. A bearing sleeve 64 is positioned on the longitudinal axis of the carrier sleeve 60, and is mounted by a plurality of radial vanes 66. A valve stem 68 extends through the bearing sleeve 64, and has a cup-shaped, rearwardly facing valve element 70 mounted on the forward end thereof. The valve element 70 constitutes a segment of a hollow sphere, and the diameter of the outer rim 72 thereof is substantially larger than that of the bypass port 58, the rim 72 being adapted to seat on the front face of the propulsion cup 34.

The rear portion of the valve stem 68 has a coiled spring 74 received thereon, which is held under compression between the vanes 66 and the keeper 76 secured to the stem's rear end. The spring 74 is held under sufficient compression to seat the rim 72 under conditions of no gas pressure behind the cup 34, and said spring has a compressive strength chosen so that the valve element 70 will open when a preset value of gas pressure is exceeded, whereby bypassing can occur.

When the pod assembly 8 has been inserted into the pipeline 2, gas pressure will act thereon to move it forwardly. A portion of that gas pressure bypasses the rear pod unit 12 through the bypass ports 52, but while the valve units 56 remain closed, no such bypassing of the front pod unit 10 occurs. Therefore, the front pod unit 10 will receive more force from the gas pressure, and will tend to lead or pull the rear pod unit 12.

If the pressure within the pipeline 2 exceeds a preset value, the valves 56 will open to effect bypassing of the assembly 8. Under this condition, however, the bypass ports 54 and 58 on the front pod unit 10 will bypass less pressure than the ports 52 on the rear pod unit 12, whereby the front unit 10 will still lead or pull the rear unit 12. This is true in part because the rear ports 52 are unobstructed, and because there are fewer ports 58 than there are ports 52 or 54. The valves 56, by bypassing pressure over a preset value, make it possible for the assembly 8 to operate at a constant speed.

The valves 56 will also react under pressure surges, and will open to effect pressure relief. As a result, sudden changes in the speed of the pod assembly 8 are avoided, and generally stable operation results.

The inspection pod assembly 8 carries photographic equipment, designed to make a complete photographic record of the interior surface of the pipeline 2. Referring to FIG. 1, the rear end of the casing 16 is fitted with a clear lens or window 78, secured by a mounting cap 80 and sealed by a seal 82. Disposed within the casing 16 is a conventional camera 84 designed to be operated by an electrical pulse, and including a suitable lens assembly 86 aimed rearwardly through the window 78. A conventional flash strobe light 88 is mounted within the pod unit 12 about the lens assembly 86, and functions to illuminate the pipeline's interior for taking a picture.

The camera 84 is intended to take a series of still pictures that slightly overlap to thus give a continuous picture of the entire inner surface of the pipeline 2. It can be a conventional movie camera equipped for single frame exposure, and designed to accept different wide angle lens assemblies 86 chosen to have the proper depth perception and resolution for the size pipeline to be inspected. For example, a 10 mm wide angle lens will typically be used for a 10-inch diameter pipeline, while a 26 inch diameter pipeline can best be photographed with a 5.75 mm wide angle lens. The lens assembly 86 is aimed with its axis lying on the central axis of the pipeline, and typically will provide the depth perception and field of view necessary to look at a complete circle of pipe some 4 feet long. Thus the camera 84 should be operated once about every 4 feet along the length of the pipeline 2.

The camera 84 is operated in response to a counter wheel mechanism 90 carried by the rear pod unit 12. The mechanism 90 includes a forwardly inclined boom 92 pivoted at its lower end to a bracket 94 on the casing 16, and which is urged upwardly by a hinged brace 96 biased by a spring (not shown) carried by the boom 92. A counter wheel 98 is mounted on the outer end of the boom 92, and rides in engagement with the inner surface of the pipeline 2. It has been found that by utilizing a forwardly inclined, spring-biased boom 92, the counter wheel 98 can be maintained in constant engagement with the pipeline's inner surface. By contrast, a rearwardly inclined boom will allow skipping of the wheel.

Also mounted on the upper end of the boom 92 is a counter 100, operated by the wheel 98. When the counter 100 has measured a preset distance, it sends a signal through a lead 102 to the control circuit for operating the camera 84 and the strobe light 88 of the camera means. Power is supplied to the apparatus from storage batteries B carried in the front pod unit 10, suitable leads being provided between the two pod units. Utilizing modern storage batteries, enough energy can be stored for a lengthy travel of the inspection pod assembly 8 through the pipeline 2, say in the range of 50 miles.

The strobe unit 88 is set back of the opening to the lens assembly 86 to avoid flashback, and can be of any desired commercial type capable of flashing in the thousands of a second range. A rapid flash is necessary to ensure no motion while the picture is being taken, the pod assembly 8 preferably being constructed with valve units 56 chosen so that a stable speed of about 8 miles per hour is attained.

The batteries are connected to the control circuit for the camera means through a D.C. converter and transformer, and said circuit includes the electronic flash equipment, the electrically driven pulse operated camera 84, an intervalometer electronic timing device, and suitable high voltage condensers. The D.C. converter and the transformer can be located in the front pod unit 10, and the remainder of the components are located in the rear pod unit 12 behind the camera 86. The condensers are charged from the high voltage D.C. converter to ensure enough power to operate the strobe light 88, and the intervalometer is designed to sense the opening of the camera shutter and flash the strobe light 88, after which the film is automatically wound. A D.C. timer in the circuit is connected to activate the shutter, and the whole sequence is initiated by the periodic pulse from the counter 100.

The control circuit for the camera apparatus is only thus briefly described herein, for the reason that such camera operating circuits are widely known in the art. In fact, any electrically operated camera, strobe light and control circuit arrangement capable of operating as herein described, and which can be activated periodically by the wheel 98, can be utilized with the invention.

To summarize the use of the two pod inspection assembly 8, the camera 84 is loaded with film and the batteries B are charged. The pod assembly 8 is then inserted upstream into the pipeline 2 by a conventional pipeline pig launcher, and is propelled by gas pressure. The resilient cups 34, 36 and 46 maintain the assembly 8 in a centered position, and the valves 56 function to stabilize the speed of the assembly at about 8 MPH.

As the pod assembly 8 proceeds through the pipeline 2, the wheel 98 measures the distance travelled and the counter 100 generates a pulse periodically, say every 4 feet. That pulse causes the camera apparatus to function, and the result is a series of overlapping photographs of the pipeline interior. The pod assembly 8 is then recovered a desired distance downstream, by a conventional pig catcher.

The two pod units of the assembly 8 make it possible to carry all the equipment within a small diameter pipeline, by dividing the equipment between the pods. Obviously, if desired and necessary, other pod units might be added on to build up the train. By interconnecting the pod units with the universal coupler 28 maneuverability around bends is accomplished, and with the feature of the invention whereby the front pod unit 10 leads or pulls on the rear pod unit, buckling and binding are avoided.

When working with large pipelines it is possible to combine all the necessary apparatus into a single pod unit, and such is shown at 104 in FIG. 7 received within a pipeline 2'. Referring to FIG. 7, the pod assembly 104 comprises a cylindrical casing 106 having a dome-shaped cap 108 secured to its forward end, a bulkhead 110 being secured in place to seal the interior of the cap 108 from the interior of the casing 106. A base mounting ring 112 is secured to the rear end of the casing 106, and has a socket 114 therein for receiving the inner end of a lens mounting sleeve 116, a seal 118 being placed between the sleeve 116 and the bottom of the socket 114.

Received within the mounting sleeve 116 are a plurality of lens or window elements 120, the sleeve 116 having a retaining flange 122 at the inner end thereof. A retaining ring 124 is engaged over the outer end of the mounting sleeve 116, and includes a flange 126 that holds the lens elements 120 in place. A plurality of securing bolts 128 pass through bores 130 in the retaining ring 124, and are threaded into threaded bores 132 in the front face of the base mounting ring 112 to complete the window assembly.

Mounted within the casing 106 between the bulkhead 110 and the lens elements 120 is camera apparatus corresponding to that of FIGS. 1-6, including a camera 134 arranged with its lens assembly 136 pointed axially down the pipeline 2', a strobe light 138, batteries B', and allied equipment. Like in FIGS. 1-6, the camera apparatus is actuated by a wheel 140 mounted on the end of a spring biased boom 142, and connected to a counter unit 144. The camera apparatus of FIG. 7 functions in the same manner as described for FIGS. 1-6.

The casing 106 has four resilient propulsion cups 146, 148, 150 and 152 mounted thereon by fixed flanges 154, annular split securing rings 156, and bolts 158. The rear cups 146 and 148 are formed like the cups 46 and have a large plurality of bypass ports 160 therethrough, said cups being split for ease of assembly.

The cup 150 corresponds to the cup 36, and has a plurality of bypass ports 162 therethrough each fitted with a relief valve 56. Similarly, the cup 152 has bypass ports 164 therethrough fitted with relief valves 56, and corresponds to the cup 34.

The propulsion cups 146, 148, 150 and 152 function much like the cups 34, 36 and 46 of FIGS. 1-6. After the pod assembly 104 has been launched in the pipeline 2, gas pressure is exerted on the propulsion cups 146 and 148, and the ports 160 therein bypass a portion of that pressure. The bypassed gas under pressure then is exerted against the cup 150, the valves 56 opening at a preset pressure value to pass gas pressure on to the front cup 152. The valves 56, as in FIGS. 1-6, function to stabilize the speed of the pod assembly, and to absorb any pressure surges.

While the need for leading of the pod assembly by the two front propulsion cups is not so great in FIG. 7 as in FIGS. 1-6, this feature is still useful in FIG. 7 because it lends stability to the pod assembly 104 and helps to maintain it centered. Thus, the number of ports in each propulsion cup 146, 148, 150 and 152, and the operating value for the valves 56, are chosen to provide a leading effect by the front cups 150 and 152.

The pod assembly 104 includes an additional feature over the device shown in FIGS. 1-6, which is a means for keeping the outer surface of the outermost lens element 120 clear and unfogged. While this means was not shown in FIGS. 1-6, it is to be understood that it can be employed with that embodiment also, if desired.

Referring again to FIG. 7, a plurality of spray nozzles 166 is secured to the annular ring 124 in positions chosen so that they can direct a gas spray across the entire surface of the outermost lens element 120. These nozzles 166 are in turn connected by tubing 168 to ports 170 in the aft end of the casing 106, which ports are connected by tubing 172 to the chamber 174 formed between the dome 108 and the bulkhead 110.

The chamber 174 is intended to receive an inert gas, such as nitrogen, and is fitted with a supply fitting 176. Before the assembly 104 is launched, the chamber 174 is filled with the inert gas under pressure, in sufficient quantity to last for the running time of the pod. The openings for the nozzles 166 are chosen to feed the gas at a very low rate, but sufficient to keep the outer surface of the outermost lens element 120 bathed therein. The resulting blanket of inert gas does nothing to inhibit operation of the camera 134, but does prevent fogging and the like of said lens window.

Obviously, many other variations and modifications of the invention are possible.

We claim:

1. A device for inspecting the interior of a pipeline, comprising: an inspection pod assembly receivable within a pipeline to be inspected, and including casing means; a plurality of propulsion cups mounted on said casing means and supporting said pod assembly centrally within said pipeline; camera means within said casing means, and counter wheel means carried by said pod assembly and engageable with the inner surface of said pipeline, said device being propelled through said pipeline by gas pressure within said pipeline, and said counter wheel means being connected with said camera means to effect periodic operation thereof.

2. A device as recited in claim 1, wherein at least one of said propulsion cups has valve means mounted thereon designed to open at a preset value of gas pressure exerted thereon, the remainder of said cups having unobstructed bypass ports therethrough, whereby the speed of said device through said pipeline is stabilized.

3. A device as recited in claim 1, wherein said inspection pod assembly includes at least two pod units connected by a universal coupler, each of said units including casing means having a plurality of said propulsion cups mounted thereon, the propulsion cups on the rearmost of said pod units having bypass port means, whereby a greater propulsion force is created on the front one of said pod units so that said front pod unit leads said rear pod unit.

4. A device as recited in claim 3, wherein the propulsion cups on said front pod unit have valve means mounted thereon designed to open at a preset value of gas pressure exerted thereon, whereby the speed of said device through said pipeline is stabilized.

5. A device as recited in claim 1, wherein said camera means includes: an electrically operated film camera directed rearwardly on the centerline of said pod assembly, and flash lamp means connected to operate with said film camera.

6. A device as recited in claim 5, wherein the aft end of said casing means is fitted with window means through which said film camera is aimed, and wherein means is provided to bathe the outer surface of said window means in inert gas during the operation of said device.

7. A device adapted to be moved by gas pressure through a pipeline, comprising: a first pod assembly, including casing means; at least two propulsion cups carried by said casing means of said first pod assembly and adapted to extend into engagement with the internal wall surface of a pipeline within which said device is placed, both of said cups having bypass ports therethrough; pressure relief valves mounted within the bypass ports of at least one of said propulsion cups, arranged to open when the pressure therebehind exceeds a preselected value; a second pod assembly disposed rearwardly of said first pod assembly, and including casing means; universal coupler means connecting said first pod assembly with said second pod assembly; a plurality of propulsion cups mounted on the casing means of said second pod assembly, and each having a plurality of unobstructed bypass ports therethrough; a window mounted in the aft end of said second pod assembly; camera means received within the casing means of said second pod assembly, including an electrically operated film camera and flash lamp means; battery means disposed within the casing means of said first pod assembly and connected with said film camera and said flash lamp means; and counter wheel means on one of said pod assemblies for engaging the wall of a pipeline within which said device is received, and connected to periodically operate said film camera and said flash lamp means in response to travel of said device through said pipeline.

8. A device adapted to be moved by gas pressure through a pipeline, comprising: a pod assembly, including casing means; at least two propulsion caps carried by said casing means and adapted to extend into engagement with the internal wall surface of a pipeline within which said device is placed, both of said cups having by pass ports therethrough; pressure relief valves mounted within the bypass ports of at least one of said propulsion cups, arranged to open when the pressure therebehind exceeds a preselected value; a window carried by the rear end of said casing means; camera means received within said casing means, and including a film camera aimed through said window and flash lamp means; and counter wheel means carried by said casing means and engageable with the inner wall of a pipeline within which said device is received, said counter wheel means being connected to periodically operate said camera and said flash lamp means in response to movement of said device through said pipeline.

* * * * *